US007110576B2

(12) United States Patent
Norris, Jr. et al.

(10) Patent No.: US 7,110,576 B2
(45) Date of Patent: Sep. 19, 2006

(54) SYSTEM AND METHOD FOR AUTHENTICATING A MAILPIECE SENDER

(75) Inventors: James R. Norris, Jr., Danbury, CT (US); John W. Rojas, Norwalk, CT (US); John F. Braun, Fairfield, CT (US); Jean-Hiram Coffy, Norwalk, CT (US); Arthur Parkos, Southbury, CT (US); Alan Leung, New York, NY (US); Wendy Chui Fen Leung, Woodside, NY (US)

(73) Assignee: Pitney Bowes Inc., Stamford, CT (US)

( * ) Notice: Subject to any disclaimer, the term of this patent is extended or adjusted under 35 U.S.C. 154(b) by 635 days.

(21) Appl. No.: 10/248,248

(22) Filed: Dec. 30, 2002

(65) Prior Publication Data

US 2004/0134690 A1 Jul. 15, 2004

(51) Int. Cl.
*G06K 9/00* (2006.01)

(52) U.S. Cl. .................. 382/119; 178/19.01; 178/20.01

(58) Field of Classification Search ................ 382/115, 382/116, 118, 119, 124, 181, 186–188; 705/60, 705/401, 406, 407, 410, 44, 67, 408; 229/300–302, 229/305, 306, 92, 921, 584, 900; 902/3; 358/472; 178/19.05; 209/584, 900
See application file for complete search history.

(56) References Cited

U.S. PATENT DOCUMENTS

| | | | | |
|---|---|---|---|---|
| 5,453,762 | A | 9/1995 | Ito et al. | 345/179 |
| 5,586,036 | A * | 12/1996 | Pintsov | 705/408 |
| 5,612,720 | A | 3/1997 | Ito et al. | 345/179 |
| 5,640,193 | A | 6/1997 | Wellner | |
| 5,647,017 | A * | 7/1997 | Smithies et al. | 382/119 |
| 5,971,587 | A | 10/1999 | Kato et al. | |
| 6,009,416 | A * | 12/1999 | Pintsov | 705/410 |
| 6,091,835 | A * | 7/2000 | Smithies et al. | 382/115 |
| 6,208,771 | B1 | 3/2001 | Jared et al. | 382/306 |
| 6,310,988 | B1 | 10/2001 | Flores et al. | 382/313 |
| 6,311,042 | B1 | 10/2001 | DeSchrijver | 455/66 |
| 6,327,395 | B1 | 12/2001 | Hecht et al. | 382/306 |
| 6,396,598 | B1 | 5/2002 | Kashiwagi et al. | 358/474 |

(Continued)

FOREIGN PATENT DOCUMENTS

GB 2306669 5/1997

(Continued)

OTHER PUBLICATIONS

Anoto Advertising Booklet—"Uniting Handwriting with the Digital World", undated, 15 pages.

(Continued)

*Primary Examiner*—Jingge Wu
*Assistant Examiner*—Abolfazl Tabatabai
(74) *Attorney, Agent, or Firm*—George M. Macdonald; Steven J. Shapiro; Angelo N. Chaclas

(57) ABSTRACT

A method and system for authenticating the sender of a mailpiece is described for identifying certain mailpieces as originating from known trusted senders. In one configuration, biometric information and/or biometric metadata is captured when a user writes on a mailpiece with a digital pen. That data is then compared to reference data in a database. Registrant data is then loaded into storage device on the mailpiece and may be digitally signed and/or encrypted by the trusted third party. In another configuration, a mailpiece includes the signature of a sender and the biometric data includes authentication data obtained from the signature that is compared to the biometric data related to the signature obtained during a sender registration process.

20 Claims, 4 Drawing Sheets

U.S. PATENT DOCUMENTS

| | | | | |
|---|---|---|---|---|
| 6,502,756 | B1 | 1/2003 | Fahraeus | 235/494 |
| 6,548,768 | B1 | 4/2003 | Pettersson et al. | 178/18.01 |
| 6,570,104 | B1 | 5/2003 | Ericson et al. | 178/18.09 |
| 6,573,887 | B1 | 6/2003 | O'Donnell, Jr. | 345/179 |
| 6,577,300 | B1 | 6/2003 | Picoult et al. | 345/179 |
| 6,586,688 | B1 | 7/2003 | Wiebe | 178/18.09 |
| 6,594,406 | B1 | 7/2003 | Hecht | 382/306 |
| 6,609,653 | B1 | 8/2003 | Lapstun et al. | 235/375 |
| 6,627,870 | B1 | 9/2003 | Lapstun et al. | 250/221 |
| 6,681,045 | B1 | 1/2004 | Lapstun et al. | 382/187 |
| 6,694,045 | B1 * | 2/2004 | Chung et al. | 382/119 |
| 6,970,583 | B1 * | 11/2005 | Black | 382/124 |
| 6,972,864 | B1 * | 12/2005 | Lapstun et al. | 358/1.15 |
| 2001/0055411 | A1 | 12/2001 | Black | 382/124 |
| 2002/0035687 | A1 | 3/2002 | Skantze | 713/168 |
| 2002/0057824 | A1 | 5/2002 | Andreasson | 382/101 |
| 2002/0107885 | A1 | 8/2002 | Brooks et al. | 707/505 |
| 2002/0126105 | A1 | 9/2002 | O'Donnell, Jr. | 345/179 |
| 2002/0193975 | A1 | 12/2002 | Zimmerman | 703/6 |
| 2003/0001020 | A1 | 1/2003 | Kardach | 235/494 |
| 2003/0046256 | A1 | 3/2003 | Hugosson et al. | 707/1 |
| 2003/0133629 | A1 | 7/2003 | Sayers | 382/313 |

FOREIGN PATENT DOCUMENTS

| | | | |
|---|---|---|---|
| JP | 2001-43000 | A | 2/2001 |
| WO | WO94/09447 | A | 4/1994 |
| WO | WO97/2259 | A | 6/1997 |

OTHER PUBLICATIONS

Anoto Advertising Booklet—"Hey, Guess What Those Nifty Swedes Have Dreamed Up Now to Revolutionize Digital Communiction?!", undated, 22 pages.

"A Comparison of Anoto Technology with Other Releeant Systems." Undated. 17 pages.

Anoto Functionality—World Wide Web pages from www.anotofunctionality.com. Accessed Jan. 29, 2004. 7 pages.

Unknown Anoto, Subsidiary of C Technologies, Initiates Collaboration with John Dickinson, UK's Leading Producer of Stationary Products, Apr. 23, 2001, Business Wire, 2 pages.

* cited by examiner

SYSTEM AND METHOD FOR AUTHENTICATING A MAILPIECE SENDER

BACKGROUND OF INVENTION

The illustrative embodiments described in the present application are useful in systems including those for authenticating a sender of an item such as the sender of a mailpiece and more particularly are useful in systems including those for using a digital pen to capture sender biometric data in order to authenticate the sender of a letter.

The United States Postal Service (USPS) provides a service of mailpiece reception, sorting and delivery to national addresses and international postal streams. The USPS processes approximately 200 billion domestic letters per year. The USPS also processes parcels. Similarly, other courier services provide services for delivery of letters and parcels.

In 2001, Anthrax spores were found on mail pieces, mail-handling equipment and in or near areas where certain mail pieces that likely contained anthrax spores were handled. These attacks pose a danger of infection that may be lethal to those in the affected areas. Additionally, there is no readily available warning system to provide an early warning that a mail piece contains anthrax spores, other biochemical hazard or other hazardous material. Certain members of the general population may fear receiving and handling mail due to the threat of mail terrorism.

Previously, the identity of a sender of a mail piece could not be adequately authenticated. Certain mailpieces include postage indicia applied by postage meters that may indicate a postage meter serial number. Mailing machines including postage meters are commercially available from Pitney Bowes Inc. of Stamford, Conn.

SUMMARY OF INVENTION

The present application describes several illustrative embodiments of systems and methods for authenticating senders, some of which are summarized here for illustrative purposes. In one illustrative embodiment, a user provides biometric information that is sent to a server. The server then checks this data against a database. If the data matches, the server sends encrypted sender data to the sender that is used by the sender to provide authentication information on the item. In other illustrative embodiments, a user utilizes a digital pen to associate biometric data with a mailpiece. A server authenticates the user by comparing some biometric data to a stored profile and sends authentication data back to the user.

DETAILED DESCRIPTION

Figure 1:
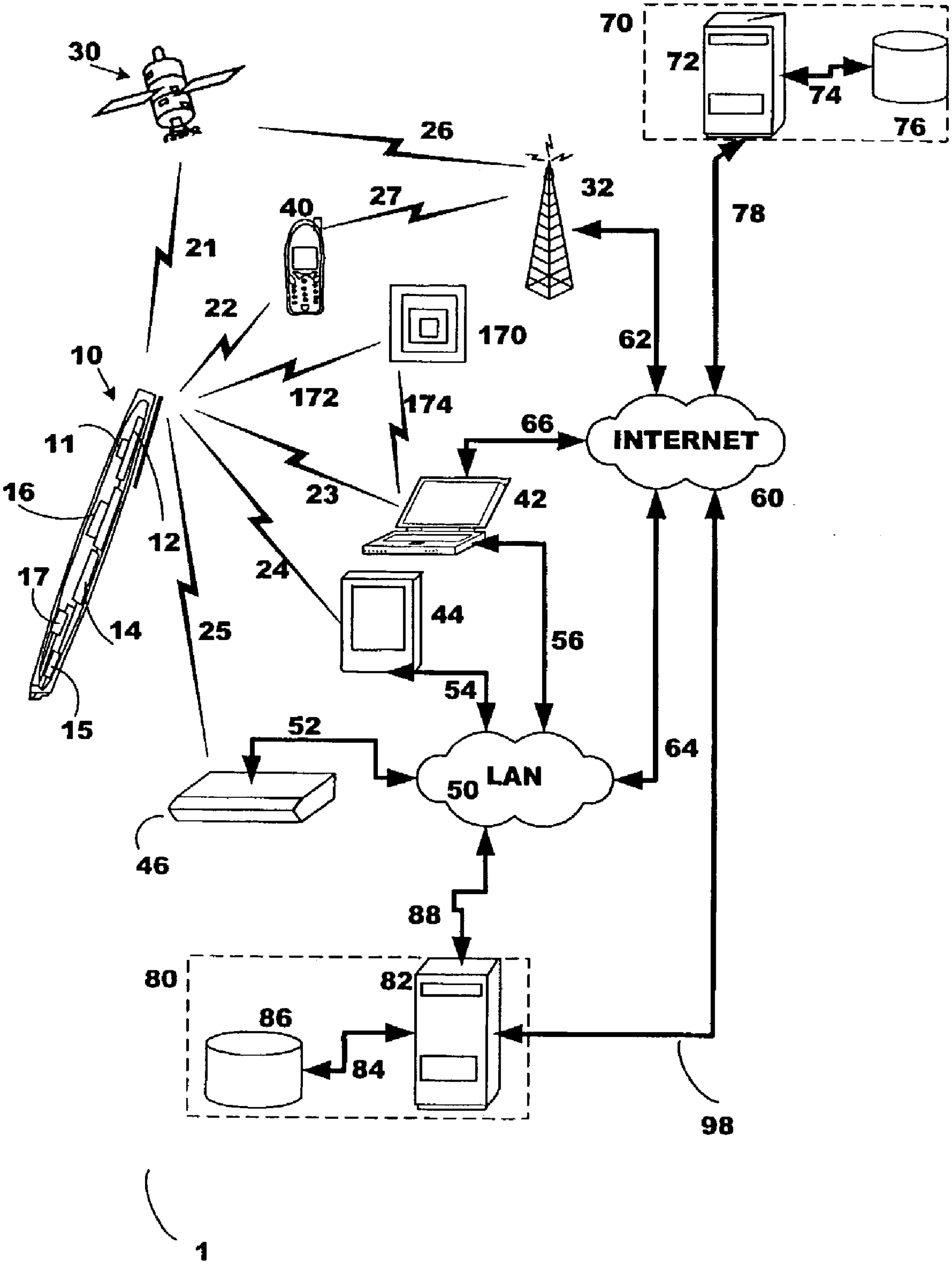
FIG. 1 is a schematic representation of a digital pen system according to an illustrative embodiment of the present application.

Systems and methods for authenticating the sender of a item such as a mailpiece are described according to illustrative embodiments of the present application.

Previously, the identity of a sender of a mail piece could not be authenticated once the mail piece had been mailed. Accordingly, it was not possible to trust the mailpiece.

Certain embodiments of the present application describe a method of capturing biometric data such as a person's signature as it is written on an envelope. The signature is then authenticated with a data server over a secure connection to confirm the sender's identity, and then encrypted information about the sender is written to an RF tag (an RFID tag, for example) that is embedded in or on the envelope and that can be later authenticated by a carrier.

Certain embodiments of the present application authenticate a sender's identity.

For the sender who is known as someone who is to be trusted, the mail piece being sent can be assumed to be safe. Therefore, the mail piece does not have to undergo special processing to test for hazardous substances such as Anthrax. While there is no physical test made in order to determine that the mail piece is absolutely safe, it is determined that the sender is known and is considered to be trusted to send safe mail. Once the mail piece has entered the system, the data embedded in the RF tag can be used for routing within the postal system.

In other embodiments, the sender can provide identification to a postal clerk in person at the post office and the mail piece can then be placed in a container used for authenticated mail pieces.

Digital pens allow a user to capture or digitize handwriting or pen strokes that the user writes on a medium such as a piece of paper. An external processor such as a personal computer may be used. Certain digital pens utilize an imaging device to scan or record an image of the pen stroke. Certain other digital pens use mechanical sensors in order to record a pen stroke. The pen systems may utilize positioning systems such as light-based scanning systems including infrared (ir) sources and detectors in order to determine an absolute or relative position of the pen. Digital pen systems include the N-Scribe system available from Digital Ink of Wellesley, Mass. and the E-Pen system available from E-Pen InMotion of Matam, Haifa Israel. A digital pointing device includes the V-Pen system available from OTM Technologies of Herzliya Israel.

Another digital pen system is the Sony-Ericsson CHA-30 Chatpen and Anoto paper available from Anoto AB of Sweden. The Chatpen utilizes a Bluetooth transceiver in order to communicate with a processor. The Anoto paper includes a grid for encoding information such as position information that is detected by the Chatpen. Additional information may be captured including information related to pressure, speed and pen attitude. The additional information includes biometric information that may be used to identify or authenticate a user.

Commonly owned, Co-pending U.S. patent application Ser. No. 10/065,261, entitled Method And System For Creating And Sending A Facsimile Using A Digital Pen, filed on Sep. 30, 2002, is incorporated herein by reference in its entirety.

Commonly owned, co-pending U.S. patent application Ser. No. 10/065,282, entitled Method And System For Creating a Document Having Metadata, filed on Sep. 30, 2002, is incorporated herein by reference in its entirety.

Commonly owned, Co-pending U.S. patent application Ser. No. 10/065,261, entitled Systems and Methods Using a Digital Pen for Funds Accounting Devices and Postage Meters, filed on Oct. 4, 2002, is incorporated herein by reference in its entirety.

A digital pen is utilized to capture information regarding the pen strokes of a user. In an illustrative embodiment, information regarding the movement of the pen including orientation, pressure, location and time may be captured and analyzed to authenticate a user. In an alternative, other biometric sources such as a retinal scan may be used to authenticate a sender.

In illustrative embodiments described herein, a system using a Chatpen and Anoto paper is described. However, other digital pen systems may be utilized. Certain digital pens utilize position determination with the actual location of the pen on a piece of paper being used to provide a relative location in terms of the location in the space of the piece of paper. Certain digital pens scan the ink as it is applied in order to digitize a stroke, while yet other pens sense the stroke using sensors such as pressure sensors, Doppler sensors, accelerometers and other sensing mechanisms.

The Chatpen and Anoto paper system provide for a pen that writes using ink on paper printed with an Anoto pattern. The Chatpen includes a sensor to detect the Anoto pattern. The detected pattern identifies the relative pen location on a grid of the pattern using a pattern look-up processor that may be locally or remotely located. The relative location allows the pen stroke and pattern look-up processor to determine where the pen is on a defined logical space of the pattern. Certain logically defined two-dimensional areas of the pattern may be defined as representing certain functions. For example, Anoto paper may be printed with a box that includes a particular portion of the pattern that is attributed the meaning of Verify Identity process.

Illustrative embodiments herein describe methods and apparatus for using pen strokes to authenticate a sender. The processes and apparatus described may be implemented using hardware, software or a combination of both. The communications channels may be wireless or wired and may utilize security techniques such as encryption. The data storage and data processors may be locally or remotely located and may use techniques such as load balancing and redundancy.

Referring to FIG. 1, a first illustrative embodiment describing a sender authentication service system 1 is shown.

Digital Pen 10 includes a processor 14, memory 12, ink 17, a camera or image sensor 15, a battery 16 and a wireless transceiver 11. It also includes biometric sensors (not shown). In an alternative, the ink 17 is machine detectable. In another embodiment, the ink is invisible. The pen 10 includes a pen tip (not shown) that writes using the ink 17. Writing sensors (not shown) provide data regarding the stroke such as pressure, speed and pen attitude.

In another alternative, the pen 10 includes audio input/output including synthesized voice output and voice recognition. In an alternative, the pen includes audio indicators such as a speaker, buzzer or speech synthesizer. Visual output is provided using an LCD display and LEDs. Tactile feedback is provided using servomechanisms. Physical input includes an input button.

The pen 10 includes an rf-id tag writing subsystem (not shown) that is capable of writing to an active or passive rf-id tag 170 adhered to an item using connection 172. The rf-id tag 170 is preferably adhered with semi-permanent glue that can be removed with a solvent. The rf-id tag is a passive tag that uses background rf energy to power the device. Alternatively an active rf-id tag with a power source may be used. The pen 110 can read and write data to the metadata storage device 170. In an alternative, storage tag 170 includes a processor.

Alternatively, other wireless communication channels can be utilized. In another alternative, a wired communications channel such as a docking station may be utilized in addition to or as a replacement for the wireless transceiver.

In another alternative, an rf-id tag writer is provided in a co-located processor such as laptop 42 that can write rf-id tag 170 using connection 174. The laptop 42 may be part of a personal area network with the pen 10 and may be used to test that the pen 10 is present in the general location before writing the tag 170. Pen 10 may be docked to laptop 42.

Using the Chatpen 10, the stroke, biometric and pattern position information is sent to the pen stroke processor via a wireless Bluetooth TM communications channel that is secure across a personal area network. However, a wired connection such as a cradle connected to an IBM compatible PC may be utilized. Bluetooth TM utilizes several layers of security. At a link level, remote/local device authentication is required before any communication can take place. At the Channel level, a link level connection occurs and then the devices need to authenticate before a communications channel is established. Additionally, the data payload being transmitted may be encrypted. In this embodiment, appropriate security at several protocol layers is utilized including the application layer.

The embodiments described herein may utilize biometric data for purposes including identification and authentication of a user locally as well as to authenticate a user to an authentication server. The pen 10 provides biometric data relating to the pen strokes used including hand speed, pen tip pressure and the inclination angle between pen and paper. Such data is referred to herein as BIODATA. In alternative embodiments, the BIODATA may include other biometric data such as a retinal scan or fingerprint scan performed using an external processor such as laptop 42 that is co-located with the pen or by the pen 10. The pen 10 is assigned a unique identification code that is a unique serial number for the pen. In an alternative, the PUID is a Bluetooth TM MAC code or other unique or group assigned code. In another alternative, the pen user is identified using the BIODATA or other identifier.

The system 1 includes at least one pen 10 that establishes a personal area network using Bluetooth TM. The paired device may be a Bluetooth TM router 46 that connects to the digital pen 10 using wireless connection 25 and provides a gateway using communications connection 52 to a system LAN 50 or to the Internet 60 (connection not shown). The paired device may include a wireless capable PDA 44 that has a Bluetooth connection 24 and a connection 54 to the LAN 50. Similarly, the digital pen 10 may connect using wireless connection 23 to laptop 42 that is connected to the LAN 50 by connection 56 and the Internet 60 using connection 66. Furthermore, the digital pen 10 may be paired with cellular telephone 40 using connection 22. The cellular telephone 40 is connected to cellular base station 32 using connection 27. Additionally, the digital pen may send or receive signals using satellite 30 using channel 21. The signals may include GPS or other signals. The satellite may be connected to a communications network such as the cellular system using connection 26.

Here, the system 1 includes an authentication server 80 that includes storage 86 connected by connection 84 to processor 82. The server 80 is connected to the LAN 50 using communications channel 88. Here, the server processes the authentication requests for users. The server 80 is connected to Internet 60 using connection 98 and is connected to carrier system 70. In a process described below, a user is authenticated to the authentication server 80 and has at least one biodata profile created using captured biodata such as the recordation of a user signature using a digital pen. In an alternative, any writing sample may be chosen and it does not necessarily have to match the writing that the user will provide when authenticating a mailpiece. Furthermore, server 80 includes an Anoto pattern lookup service for processing Anoto pattern information used by pen 10.

Carrier system 70 is connected to a network such as the Internet 60 using connection 78. Server 70 includes processor 72 connected to storage 76 using connection 74. Here, the carrier system is preferably the USPS system and includes an rf-id tag reader, information decoder and decryption facilities to enable the rf-id tag data to be read and verified to be authentic.

The Handheld processor 44 is a PDA including a docking cradle or wireless connection for access to a LAN 50. Coarse position information regarding digital pen 10 location can be determined by locating the paired device such as cellular telephone 40 that can be located by triangulation if transmitting. This data can be sent to server 80 and may be used in the authentication determination (only certain regions are acceptable) and can be sent back to the user with the sender data as an indication of origination.

Cellular telephone 40 is connected to cellular operator system 32. The cellular telephone could simply provide a data link such as a GSM link. In an alternative, the cellular telephone could include additional processing capacity and be used to capture and/or manipulate data. Corporate LAN 50 is connected to the Internet 60 using T1 line 64. Alternatively, the connections could be over private lines or may be a Virtual Private Network. It is contemplated that all of the connections utilize appropriate security measures.

Other well-known input devices, servers, processors, networks and communications mechanisms may be used. A back-end application may be utilized to process pen strokes. The back end application would then recognize command strokes or strokes in command locations identified by the pattern. The data written by a user in a particular data input flied can be rasterized and then subjected to Optical character recognition (OCR) in order to identify the data written by the user.

Laptop 42 utilizes a mobile Pentium 4 processor and Windows XP. The server processors are geographically and load balanced application servers using systems available from Sun Microsystems and the storage servers use multiple location redundant backup systems. Additionally, other appropriate wireless and wired networks and connections may be utilized. It is contemplated that other communications channels such as OC-3 lines or wireless connections could be used in place of the T1 lines. Similarly, the other communications channels could be replaced with alternatives. Various communication flows may be utilized, some of which will be chattier than others. Laptop 42 could also provide gateway access to the TCP/IP Internet network.

The present embodiment may alternatively use any pen or stylus like device that provides for electronically recording strokes. Position information may be processed into strokes or transmitted in a separate data stream.

The digital pen 10 approximates the size of a traditional pen and may be used by a user to handwrite information. The digital pen detects pattern information that may be relayed to a pattern lookup server 70 across the Internet 60. Responsive information may then be sent back to the message processor.

Here, the co-located processor 44, 42, 40 or remote processor 82 may receive pen data including stroke data, pattern data and other input data.

Transmitter/receiver 11 transmits and receives signals to and from the paired base unit 40, 42, 44, 46 that provide a communications link for sending pen data that is used by the back end pen stroke/application layer process to coordinate the authentication process.

In an alternative, the pen 10 includes the processor for processing pen stroke data and coordinating the authentication process with the authentication server 80. The pen 10 may include a command processor and a communication processor including an analog cellular modem such that the digital pen 10 includes the entire system for requesting an authentication process from server 80. In an alternative, pen 10 and the message processor provide handwriting recognition. The message processor may include handwriting recognition or may employ a limited set of symbol recognition for command processing. Using the Anoto pattern lookup, the system may rely on location in the pattern to determine commands rather than be recognizing strokes.

In another alternative embodiment, other biometric data may be utilized. For example, the digital pen 10 may be paired with an external processor such as a PDA 50. A shared secret is then provided to the pen 10 and the PDA 50. In one alternative, the user does not type in a device PIN for pairing, but a central data system uses unique identifiers such as MAC codes to pair devices. Thereafter, the PDA could also be used to capture biometric data related to a user. In an alternative, the user is authenticated using a customer number and password. Alternatively, the user could be authenticated using biometrics and the pen could be authenticated using its unique Bluetooth 48 bit MAC address.

Figure 2A:
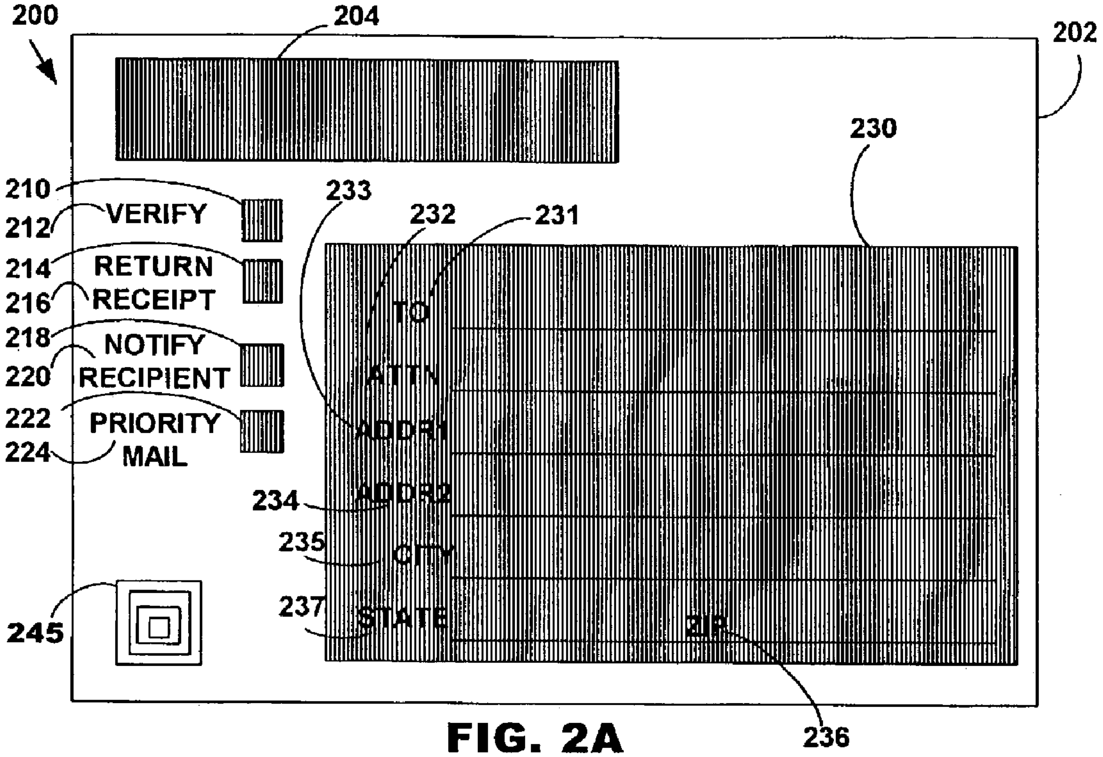
FIG. 2A is a schematic representation of an item having authentication storage according to an illustrative embodiment of the present application.

Referring to FIG. 2A, a schematic representation of a representative envelope used for authentication is shown. In an alternative, any item to be sent could be utilized including a label to be placed on a parcel.

Envelope 200 includes an Anoto pattern area 202. The envelope 200 includes an Anoto pattern sender data area 204. Sender data 204 is utilized to collect biometric data from the user. For example, the user handwrites the user's signature in box 204. The digital pen then collects biometric information including pen movement, orientation, pressure, location and time that can be processed as an authentication packet that is sent to the authentication server for comparison against a profile. A PKI infrastructure can be used to sign and authenticate the packet to a user or to a pen. In an alternative, the user writes a writing sample that is used to collect biometric pen stroke information. The writing sample does not necessarily have to be identical to the sample or samples provided to the authentication server during the account set-up procedure. The user does not have to enter a return address in box 204 because the authentication server is able to lookup that information based upon the biometric data. The server can also store return address information in the storage device 245 such as an rf-id tag. Other storage devices may be used including integrated circuits and 2 D bar codes.

The biometric data may be sent to the authentication server with an ID provided by the digital pen 10 or another processor such as a co-located PDA processor.

In this illustrative embodiment, the item is an envelope 200. However, the user may instead utilize a label for a parcel or other item. The envelope includes a destination information section 230. The Anoto pattern may be utilized such that the pattern is unique only as to specifying a destination data field. However in an alternative, the Anoto pattern may be unique to the particular user for a controlled envelope in the area of box 204.

The destination box 230 includes destination address data fields that include the To field 231, an ATTN attention field 232, a first address field ADDR1 133 and a second address field ADDR2 234. The destination box 230 also includes a city field 235, state field 237 and zip field 136.

The system 1 may be used to recognize the destination address fields 230 using optical character recognition or other pen stroke recognition methods. In an alternative, only the zip code is processed. In another alternative, the destination address is processed through a known address cleansing process by the authentication server 80 and the cleansed or forwarded address information is stored in rf-id tag 245 without the user knowing that the address was not correct. In an alternative, the user is notified of the potential discrepancy and prompted for a choice among address options.

Box 210 and identifier 212 are used to notify the local processor that the user has completed entering the challenge information in box 204 and to request authorization. In an alternative, the system waits a predetermined amount of time such as five seconds after the user stops writing in box 204 in order to process the request. Additionally, determining that a user is writing in another box after box 204 can be used as a signal to start the authentication request.

Additional services may be requested such as a return receipt service by checking in box 214 identified by identifier 216. Similarly, priority mail processing can be requested using check box 222 and identifier 224. In box 218, the user can request the intended recipient be notified of the mailpiece entering the mail stream. The user may also request other track and trace processing. In an alternative, a services box may allow the user to enter service codes that are recognized by analyzing the pen strokes to determine the services requested.

Figure 2B:
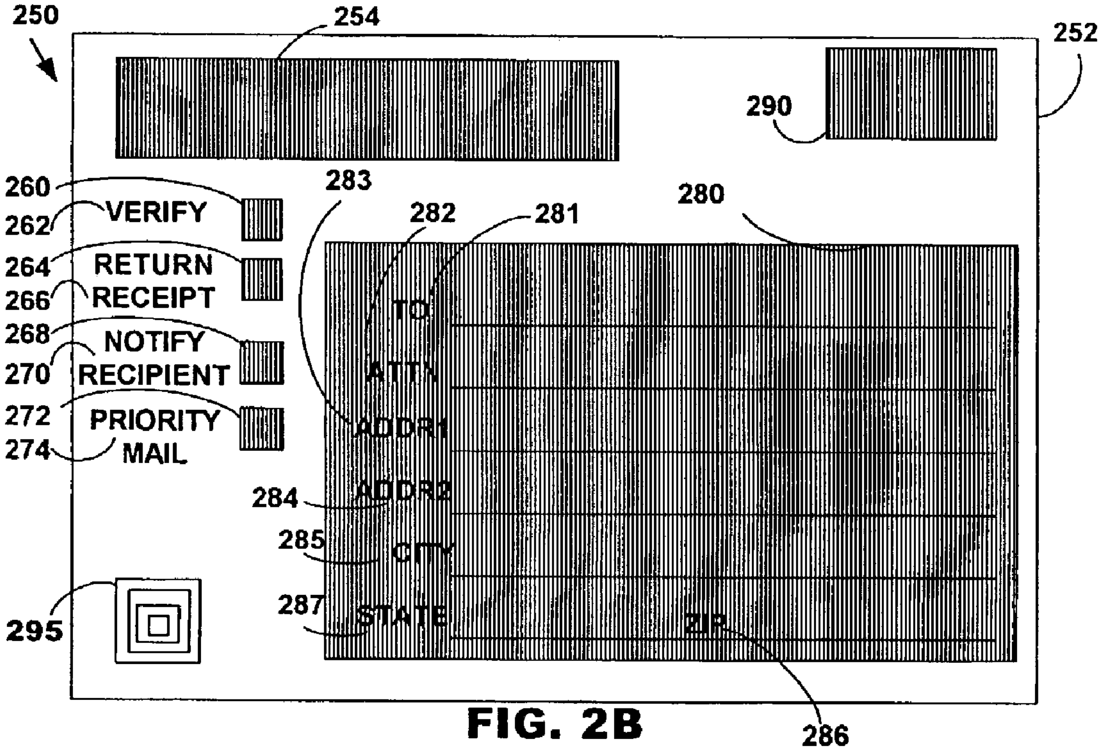
FIG. 2B is a schematic representation of an item having authentication storage according to another illustrative embodiment of the present application.

Referring to FIG. 2B, a schematic representation of a representative envelope used for authentication that has a postage field is shown. Here, a postage value field 290 is used. The user writes a postage amount in the box 290 and the processor recognizes it. The local processor then sends a postage debit request to the authentication server 80 as well as a user authentication request. If the user has the sufficient funds, the amount is debited from the user account and the user is authenticated. In such a manner, postage prepayment is secured before the item is placed in the mail stream. Other data regarding the mailpiece including the services requested and the source and destination addresses may be used to verify the correct postage. The user may be prompted to remedy any under payment.

Here, the envelope 250 includes Anoto area 252. The Anoto pattern need not be printed on non-data entry areas of the envelope or label.

Data storage 295 includes a memory such as an rf-id tag or 2D bar code. Address box 280 includes address fields 281, 282, 283, 284, 285, 286 and 287 as above. Service boxes 260, 264, 268 and 172 with respective identifiers 262, 266, 270 and 274 are used as above. User signature area 254 may also be used to enter a writing sample such as "the red fox jumped." In an alternative, any item to be sent could be utilized including a label to be placed on a parcel. In another alternative, the envelope 250 could be a reusable envelope in which the Anoto pattern area can be wiped clean for reuse.

Figure 3:
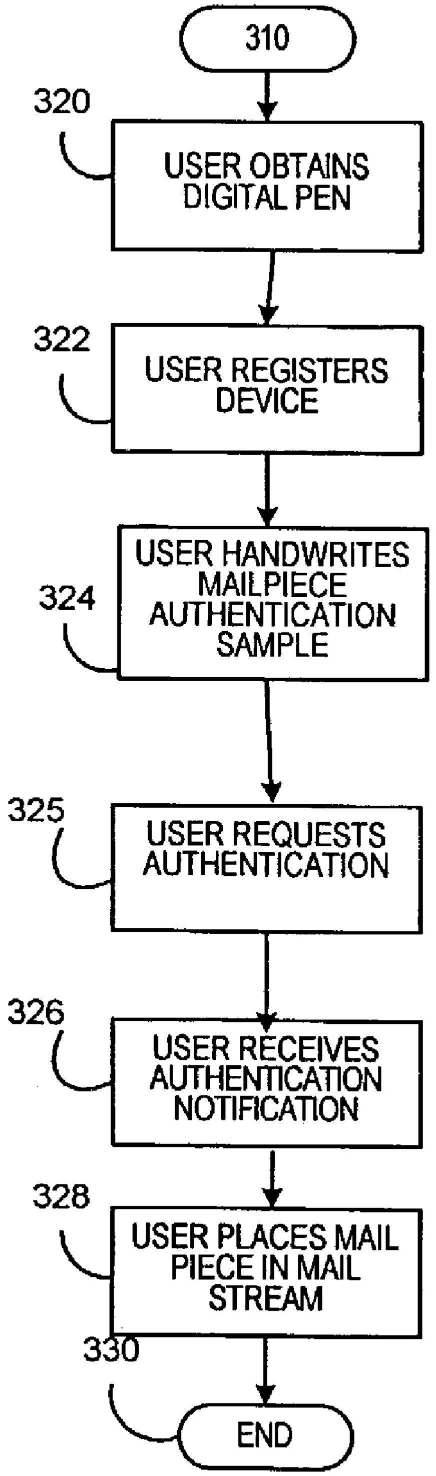
FIG. 3 is a flow chart showing a process for a user to authenticate the sender of an item according to an illustrative embodiment of the present application.

Referring to FIG. 3, a process for initializing a user record and then comparing an authentication data packet to at least one profile is described according to an illustrative embodiment of the present application.

An envelope is printed with a box 204 for the sender's signature and a check box that is used to initiate the identification and authentication of the sender as illustrated in FIG. 2A. The sender signs her name in the Sender's Signature box 204 and then checks the Verify Identity box 210. The pen 10 transmits the signature to the verification system 80 either by wire or wirelessly using a technology such as Bluetooth TM. The verification system looks up the signature in a database containing signatures of persons known to be trusted who have signed up to use the service and have passed appropriate levels of scrutiny to be considered as trusted. Once the signature has been verified, the verification system then writes the sender's name and address and the fact that the signature has been authenticated into the embedded RF tag 245. An authentication certificate may be signed and stored in the tag 245. The verification system 80 can give the sender some type of feedback such as a message box on a CRT or perhaps a beep or a flash of an LED on the pen to indicate that the signature was verified.

In step 310, the process starts. In step 320, the user obtains a digital pen 10 for use with the service. In step 322, the user registers the device, thereby creating a security profile having biometric data. In one embodiment, the user appears at the office of the authentication server 80 agent to present identification and to provide a writing sample or samples such as a handwritten signature. In an alternative, other biometric information may be collected such as a retinal scan.

Thereafter, the user account is established and the user may utilize the system to obtain authentication data including authentication indications such as signed codes from the trusted third party authentication server 80. Optionally, the authentication data may include data processed with added services such as address cleansing and may also include sender data and mail processing data such as routing information.

In step 324, the user obtains an envelope 202 (that may be printed locally by the user) and handwrites the signature in box 204. In step 325, the user request authentication. In step 326, the user receives an authentication notification and the mailpiece is completed. In step 328, the user places the mailpiece in the mail stream and in step 330 the process ends.

In an alternative, the authentication packet sent to the server 80 may include intended recipient information recognized from the envelope or otherwise available such as data that is electronically available if it is printed on the envelope.

Figure 4:
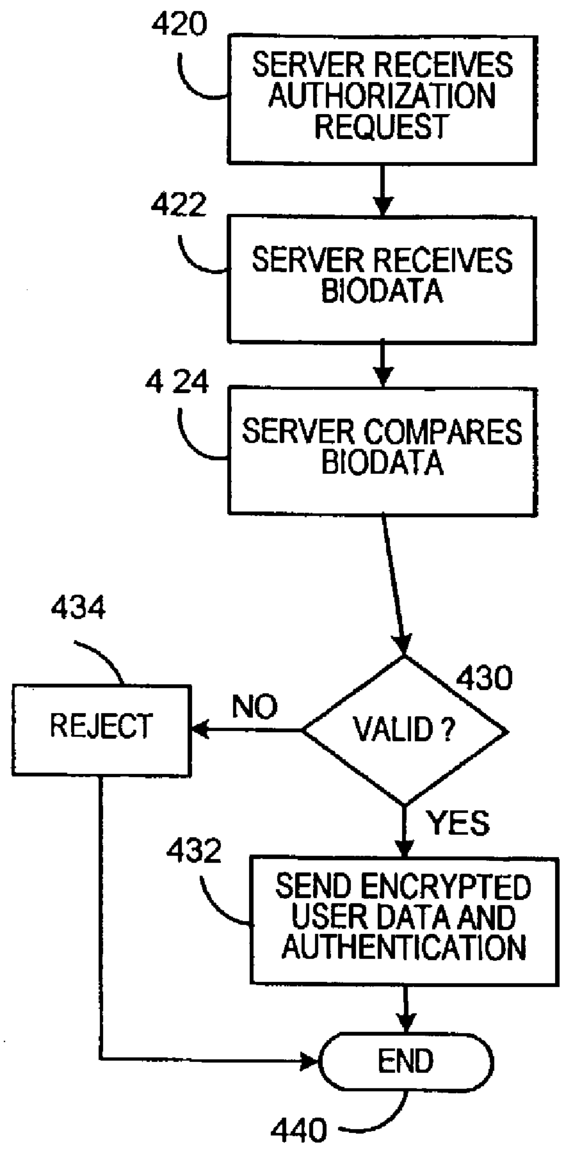
FIG. 4 is a flow chart showing a process for a server to authenticate the sender of an item according to an illustrative embodiment of the present application.

Referring to FIG. 4., a process for providing user authentication data to a user is described according to an illustrative embodiment of the present application. In step 420, the server receives an authentication request from the client side authentication process that may be located in a digital pen, a co-processor that is co-located near the digital pen or another processor.

In step 422, the server receives the biodata. The user request includes a user id and biometric data that will be used in a comparison against a profile. The biodata includes information regarding pen strokes made on an envelope. In an alternative, the biodata is used to determine the user id and the biometric data may be from another source such as a retinal scan.

In step 424, the authentication server compares the biodata with at least one profile. In step 430, the authentication server determines if the request is valid. If it is not, the process proceeds to step 434 and rejects the request. Remedial action may be taken, such as suspending the account and notifying the relevant carrier of the failure.

If the request is valid, the authentication server encrypts and signs the authentication data and sends it to the user. The authentication server may also notify the post of the authentication data that may include one or more of routing information, sender information and recipient information. In step 440, the process ends. The trusted third party 80 may digitally sign or encrypt the authentication data send to the user.

Figure 5:
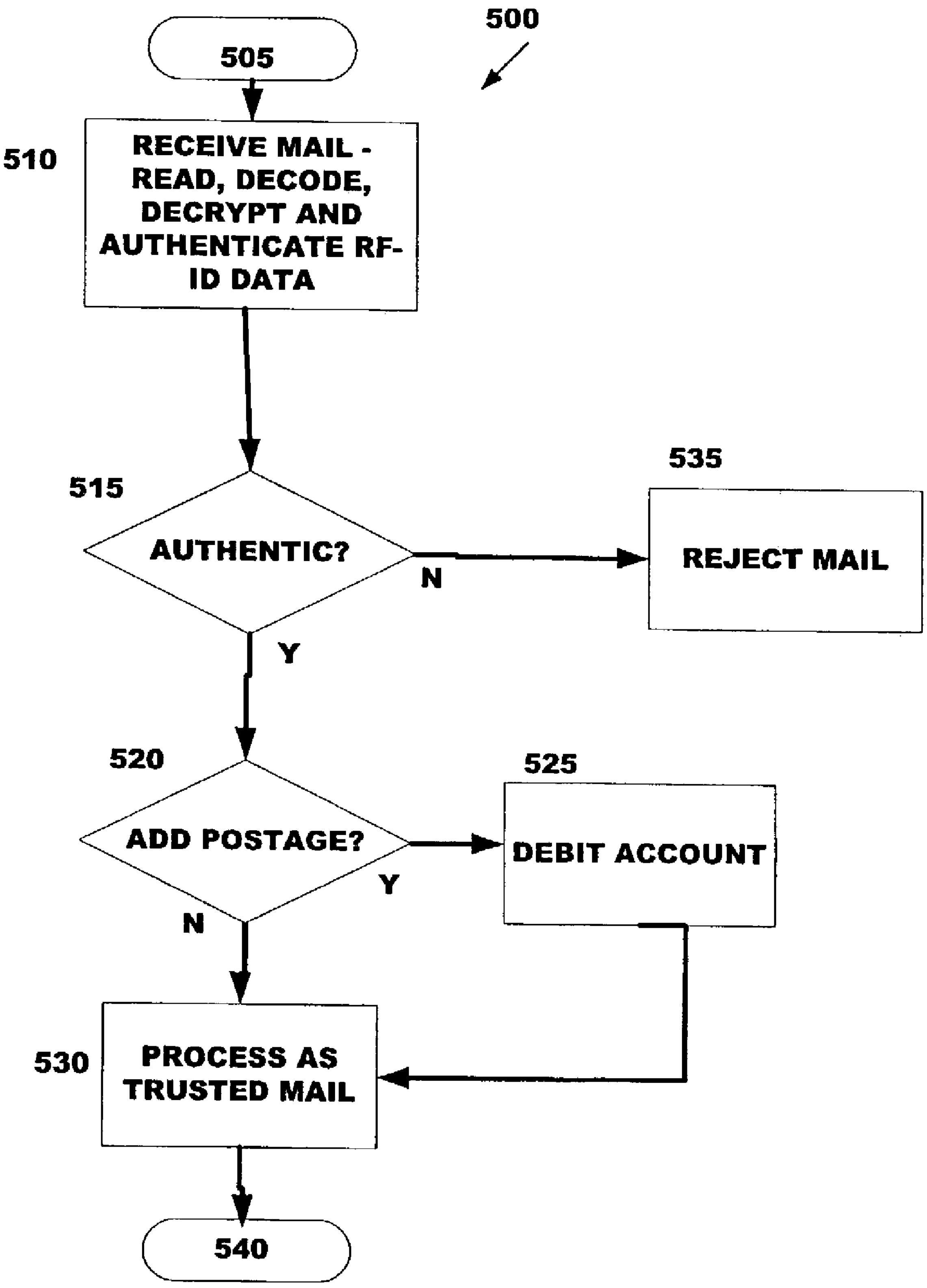
FIG. 5 is a flow chart showing a process for processing a mailpiece according to an illustrative embodiment of the present application.

Referring to FIG. 5, a process for accepting items into a carrier system is shown according to an illustrative embodiment of the present application.

The carrier, such as the postal service, uses RF-ID tag readers in the processing stream to route the mail piece based on the information contained in the tag. For example, the tag may include destination information. If the sender address was authenticated as someone who is known to be trusted, the postal service automatically debits the sender's account for the postage due and routes the mail piece to a processing station for safe mail pieces. In an alternative, the postal service uses several levels of trust based on the individual's credentials. If the sender of a mailpiece is authenticated, but is not known to be trusted, or is at a low level of trust, the mail pieces might be routed to a different processing stage that uses additional inspection techniques to verify the safety of the mail piece. The system can optionally read the recipient's name and address, verify the recipient's address using standard techniques, and then also write that information into the tag for use by the postal service during further routing operations.

The process 500 starts in step 505. In step 510, the carrier, such as the United States Postal Service (USPS) receives a mailpiece and determines that the mailpiece purports to be from a trusted sender. This determination could be made be sensing the presence of an rf-id tag or other information such as by reading a 2D bar code. The USPS reads the data device on the mailpiece such as the rf-id tag or 2D bar code. The USPS then decodes the information, decrypts the data if it is sent in encrypted form and then authenticates the data. It is preferred that the authentication server 80 provides a signed hash of the authentication data to the user so that that USPS can then authenticate that the information sent by the user to the USPS is actually authenticated as originating at the trusted authentication server system 80.

In step 515, the USPS determines if the mailpiece was sent by the trusted sender, and if not, the process proceeds to step 535 in which the mailpiece is rejected and any appropriate remedial action initiated.

In step 520, the mailpiece is authentic. The USPS may then determine whether a post-payment solution is utilized and determine if additional postage is required.

Here, as described above, the sender may utilize a traditional payment procedure such as a stamp or meter indicia. Otherwise, in step 525, a postage due amount is calculated and the user account debited. In step 530, the mailpiece is processed as trusted mail. In step 540, the process ends.

In an alternative, more than one level of trust is utilized and the mailpieces are processed according to the level of trust ranging from complete trust with no secondary procedure, to partial trust with some secondary safe mail procedure and to no trust with a full safe mail decontamination procedure.

In an alternative, the USPS system 80 also provides the authentication services to the user and a private symmetric key could be used to ensure that an unscrupulous sender did not forge the authentication information.

In another alternative applicable to any of the embodiments described herein, the user may select a Notify Recipient box shown as shown in FIG. 2A. The authentication verification system 80 will perform handwriting recognition on the recipient's name and address that the user has written with the digital pen 10. System 80 will then check its database for an email address entry for the recipient and authorization from the recipient for a notification to be sent. If an email address for the recipient is found, it will be written to the RF tag as authentication data. The postal service will then send an email to the recipient stating that the letter has been mailed by the sender and is in transit. The postal service may also debit the sender's account an additional fee for the notification service. Additional check boxes can be printed on the envelope to be used to select a level of service such as priority mail or for return receipt requests among others.

In another alternative applicable to any of the embodiments, the RF tag includes tag pre-programming with the sender's name and address when the envelope is purchased. In this alternative, the verification system will know exactly whom the sender is supposed to be based on the information in the tag, and only the sender's signature will be authenticated by the system.

The privacy of the sender may be protected in several ways. Through the use of an envelope according to an embodiment of the application that does not require sender identity or address, the sender's address does not need to appear on the envelope. However, if the sender data is not written to the RF tag correctly the postal service would not know where to return the mail piece if needed. The sender's signature or writing sample can also be protected in several ways. The signature verification system does not necessarily use the ink as part of the verification process. Accordingly, in alternative embodiments, the pen could use no ink or use invisible or disappearing ink. Alternatively, the signature box could be placed on the inside flap of the envelope and thus hidden when the envelope is sealed. Finally, the writing sample does not have to be the sender's signature. It can be any written sequence that the system can use for authentication when the postal service signs up the sender as someone who can be trusted.

In an alternative, the data placed in the RF tag also provides benefits to the postal service by providing for tracking and routing of the mail piece. In certain embodiments, no stamps are required due to the use of the envelope 200 because the RF tag is securely programmed to indicate the amount of postage that has been debited from the sender's account as well as other information that is pertinent.

In another alternative applicable to any of the embodiments, Wi-Fi enabled wireless systems are utilized and the external processor comprises a Wi-Fi capable hand-held pocket PC such as the Toshiba e740 Pocket PC. Furthermore, differing types of processors and logic systems may be supported. For example, JAVA based PALM OS devices may be utilized. The message logic, processing logic, security logic, user interface logic, communications logic and other logic could be provided in JAVA format or in a format compatible with individual platforms such as Windows CE and PALM OS platform. Similarly, other portable computing devices such as laptop computers and tablet computers and wireless capable computers could be utilized. Other platforms such as those using Symbian OS or OS-9 based portable processors could be utilized.

In another alternative applicable to any of the embodiments, authentication procedures utilize a token controller having a secure token key storage such as an Button® available from Dallas Semiconductor in which an attack, for example, a physical attack on the device, results in an erasure of the key information. Passwords may be used, such as a password to access the device. In an alternative, the password may include biometric data read from a user. Alternatively, other secret key or public key systems may be utilized. Many key exchange mechanisms could be utilized included a Key Encryption Key. Additionally, authentication and repudiation systems such as a secure hash including SHA-1 could be utilized and encryption utilizing a private key for decryption by public key for authentication.

Known systems such as C++ or Word and VBA may be utilized to implement the processes described. The Anoto toolkits may also be utilized. Authentication data may be used to ensure that only authorized users have access to the rf-id tags. Other systems, processes and postage evidencing methods may be utilized, such as those described in patent applications incorporated by reference above.

The present application describes illustrative embodiments of a system and method for providing sender authentication. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for authorizing a sender of an item using a trusted third party authenticator system comprising:

obtaining a digital pen for capturing biometric information;

registering the digital pen including providing a biometric data sample;

handwriting a writing sample on the item;

requesting authentication of the sender of the item by sending a request to the trusted third party authenticator system including the writing sample;

receiving authentication data from the trusted third party authenticator system; and transferring the authentication data to the item.

2. The method of claim 1 wherein:

the item is a mailpiece label.

3. The method of claim 1 wherein:

the item is an envelope.

4. The method of claim 3 wherein:

the writing sample is a signature.

5. The method of claim 4 wherein:

the writing sample is a signature written on the inside of the envelope.

6. The method of claim 1 further comprising:

storing the authentication data in a storage device removably adhered to the envelope.

7. The method of claim 6 wherein:

the storage device comprises an RF-ID tag.

8. The method of claim 7 further comprising:

placing the mailpiece in the mail stream.

9. The method of claim 1 further comprising:

receiving an indication that postage was paid.

10. The method of claim 1 wherein:

the registering process includes providing an initial reference writing sample.

11. The method of claim 1 further comprising:

obtaining biometric data relating to the user.

12. The method of claim 11 further comprising:

obtaining biometric data relating to the pen strokes of the user.

13. The method of claim 11 further comprising:

creating at least one profile for the user by analyzing the biometric data.

14. A method for verifying the authenticity of the sender of a mailpiece:

obtaining a mailpiece authentication data from the mail piece;

obtaining a user authentication profile;

comparing the mail piece user profile to the user profile; and assigning a level of trust from among a plurality of defined levels of trust to the mailpiece based upon the comparison; and processing the mailpiece based upon the assigned level of trust.

15. The method of claim 14 wherein:

the user profile include information obtained using user biometric data.

16. The method of claim 15 wherein:

the user biometric data comprises sample pen stroke data.

17. A method for authorizing a sender of an item using a trusted third party authenticator system comprising;

receiving sender authentication data from the sender of the item at the trusted third party authenticator system;

receiving destination information associated with the item;

obtaining reference sender authentication data associated with the sender;

obtaining routing information associated with the item and the intended carrier system that is to be used for sending the item;

comparing the sender authentication data with the reference sender authentication data;

obtaining an item authentication data associated with the sender and the item;

sending the item authentication data to the sender if the comparison results in authentication; and sending the item authentication data to the intended carrier.

18. The method of claim 17 wherein:

the item authentication data is digitally signed by the trusted third party; and the item authentication data includes sender information and recipient information.

19. The method of claim 18 wherein:

the item authentication data includes an indication of the determined level of trust.

20. The method of claim 17 further comprising:

utilizing the comparison of the sender authentication data with the reference sender authentication data to determine a level of trust from among a plurality of defined levels of trust.

* * * * *